---

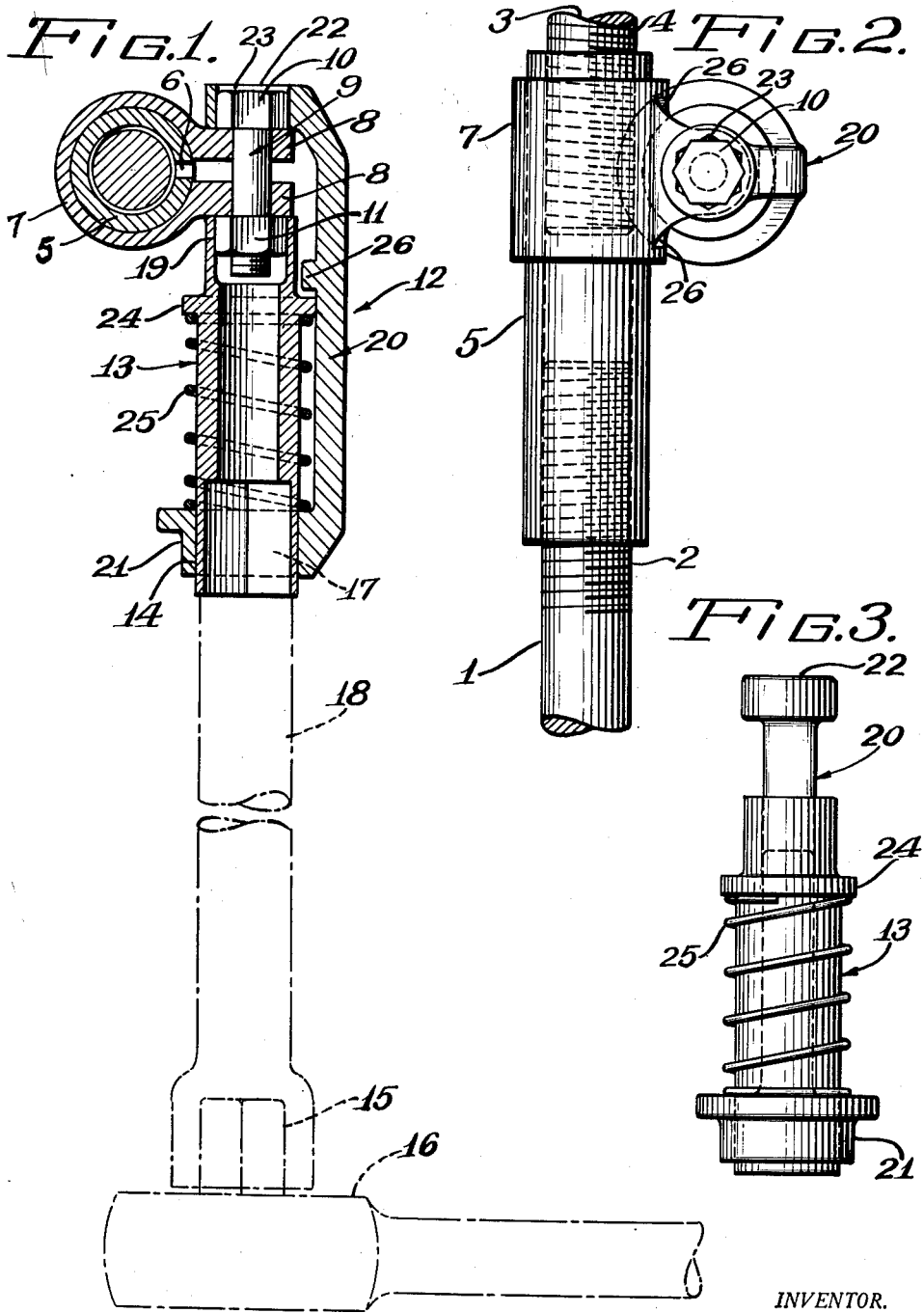

2,704,474

AUTOMOBILE TIE ROD TOOL

Chester P. South, Rock Island, Ill., assignor to Bear Manufacturing Company, Rock Island, Ill., a corporation of Delaware Application September 22, 1953, Serial No. 381,657

3 Claims. (Cl. 81—55)

---

This invention relates to improvements in a tool for conveniently locking the adjustable connection between abutting component parts of a conventional tie rod for the steering mechanism of an automotive vehicle.

In the steering mechanism of the usual automobile the front wheels pivot about their respective king pins when the vehicle is being steered. Of course, when a vehicle turns, the radius of curvature of the path of travel of the inside wheel is less than the radius of curvature of the path of the outside wheel. Hence, the usual steering mechanism is so constructed that for a predetermined angular rotation of the steering wheels, the front wheels pivot throughout different angles. To preserve this relationship, a tie rod is employed which connects together the two spindle arms associated with the opposite front wheels. As a convenient means of adjusting the pivoting relationship between the opposite wheels, the tie rod is made in two component parts which are connected together by a screw threaded sleeve which engages the threaded ends of the tie rod components and holds them in desired abutting relationship.

For conveniently locking the tie rod components in adjusted position, the threaded sleeve which connects the components is of the split type whereby by squeezing the sleeve, the sleeve threads lock or bind upon the threaded ends of the tie rod components and thus render the components rigid relative to each other. A split collar is usually employed to squeeze the split sleeve upon the tie rod components, said collar being actuated to squeeze or release the sleeve by a threaded bolt and nut arrangement. Hence, to lock or unlock the sleeve bolt and nut must be manipulated.

Because of the more or less inaccessible position of the adjusting sleeve on the tie rod components, difficulty is frequently encountered by a single operator in tightening and loosening the nut and bolt means, the operation usually requiring the operator to manipulate two wrenches in a most awkward position.

The present invention contemplates a simple tool for conveniently performing this most awkward and difficult task, the tool being so contrived as to permit a single operator conveniently to engage and disengage the tool with the work and also permit the quick and convenient manipulation of the nut and bolt means.

As an additional feature of the invention the tool can be constructed economically and is so contrived as to permit its being used with a conventional ratchet wrench.

Other objects and advantages of the present invention will be apparent from the accompanying drawing and following detailed description.

In the drawing,

Fig. 1 is a longitudinal sectional view taken through the tool embodying the present invention.

Fig. 2 is a top plan view of the tool as applied to the nut and bolt head of the clamping collar for the locking sleeve.

Fig. 3 is a side elevational view of the tool.

Referring in detail to the drawing, 1 indicates one component of a tie rod for the conventional steering mechanism of an automotive vehicle. An end portion of the component 1 is provided with threads 2. The opposite end of the component 1 is pivotally connected to the spindle arm associated with one of the front wheels of the vehicle. The reference numeral 3 indicates the other component of the tie rod, the end of which is pivotally connected to the opposite spindle arm associated with the opposite front wheel of the vehicle. An end portion of the component 3 is also provided with threads 4.

In operation, the components 1 and 3 are adapted to be held in coaxial relationship and to accomplish this purpose a sleeve 5 is employed, said sleeve being internally threaded whereby to engage the threads 2 and 4. The threads 2 and 4 are pitched in opposite directions whereby rotation of the sleeve 5 will simultaneously move the components 1 and 3 axially toward or away from each other whereby the opposite spindle arms will be moved toward or away from each other to effect an adjustment of the opposite wheels associated with the spindle arms relative to each other.

The sleeve 5 is provided with a longitudinal slot 6 whereby said sleeve may be squeezed onto the threaded ends of the components of the tie rod to lock the sleeve in place.

A collar 7 embraces sleeve 5, said collar being of the split type and terminating in opposed lugs 8. A bolt 9 having a hexagonal head 10 is positioned through apertures provided in the lugs 8 and by means of a hexagonal nut 11 a squeezing pressure may be exerted upon the collar which in turn tends to squeeze the sleeve 5 thereby locking the sleeve upon the threaded ends of the tie rod components. In this fashion the sleeve may be rotated to properly adjust the effective length of the tie rod and when said adjustment is accomplished the nut 11 may be drawn taut upon the bolt 9 whereby the split collar causes the internal threads of the sleeve 5 to lock or bind upon the threads 2 and 4 of the tie rod components.

The present invention comprises a tool 12 which is adapted to manipulate the nut and bolt arrangement hereinbefore described which is associated with the split collar 7. As is well known, the tie rod of a conventional steering mechanism is disposed adjacent the front axle of the automobile and it frequently happens that the adjusting sleeve 5 is positioned in an awkward or relatively inaccessible place. Heretofore, when a single operator was engaged in adjusting the sleeve 5 it was necessary for the operator to employ two wrenches, one for the hex head 10 of the bolt and the other for the nut 11. This is a more or less difficult operation for a lone operator particularly in the light of the relatively inaccessible position of the sleeve with respect to the other portions of the automobile. As a feature of the present invention the tool 12 permits a convenient engagement with the bolt and nut means and also permits quick manipulation of the bolt and nut means to tighten or loosen the collar 7.

The tool 12 comprises a substantially cylindrical body 13 which at one end is provided with a recess 14 for the reception of the head 15 of a conventional ratchet wrench 16 or the head 17 of a conventional extension 18 which in turn may be mounted upon the lug 15 of the wrench 16. The opposite end of the cylindrical body 13 is also provided with a recess 19 which may be of the usual star shaped contour whereby a nut or bolt head of polygonal section may be readily gripped.

An extension 20 is adapted to be mounted upon the body 13, said extension at one end having a sleeve portion 21 which slidably and rotatably embraces the cylindrical portion of the body 13. At the opposite end of the extension 20 an anchor portion 22 is formed, said anchor portion being provided with a star shaped recess 23 whereby to engage a polygonal nut or bolt head, such as the bolt head 10. The arrangement is such that the extension 22 is in substantial alignment with the axis of the body 13 and the recesses 19 and 23 are disposed in substantially axial alignment.

An annular rib 24 is carried by the cylindrical body 13 and a coil spring 25 embraces the body, said coil spring bearing at one end upon the annular rib 24 and at the other end bearing upon the sleeve portion 21 of the extension 20. The arrangement is such that movement of the sleeve portion 21 of the extension 20 along the length of the cylindrical body 13 is resisted by the spring 25, that is, when said sleeve portion is moved toward the rib 24. In order to prevent the unintended removal of the extension 20 from the body 13 a lug 26 is formed upon the inner portion of the extension 20, said lug being adapted to act as a stop to limit movement of the sleeve 21 away from the rib 24.

In utilizing the tool 12 the operator moves the sleeve portion 21 toward the annular rib 24 whereby the spring 25 is compressed. This motion separates the recess 23 from the recess 19. In this position the anchor portion 22 of the tool may be moved over the head 10 of the bolt 9 and said head may be brought into engagement with the star shaped recess 23. The tool, in this position, will have the recess 19 disposed in substantial alignment with the nut 11 whereby the extension may be permitted to be moved under the influence of the compressed spring 25. This operation tends to move the anchor portion 22 toward the body 13 whereby the nut 11 is engaged in the star shaped recess 19. This is the position of the parts illustrated in Fig. 1 of the drawings whereby the tool is in position to either loosen or tighten the nut 11 upon the bolt 10.

It can readily be seen that a twisting motion exerted upon the wrench 16 will tend to rotate the body 13 thereby tending to rotate nut 11. The anchor portion 22 is flared outwardly as at 26 in Fig. 2, said flared portion seating upon the upper lug 8 where it joins with the body of the collar 7. By virtue of this seated position of the flared portions 26 upon the collar 7 rotary motion of the extension 20 with the body 13 will be prevented. This effectively locks the bolt against rotational movement whereby the nut 11 may be either tightened or loosened.

It can readily be seen that tightening or loosening of the nut 11 will clamp the collar 7 snugly upon the sleeve 5 which in turn will lock or bind upon the components 1 and 3.

Although the device 12 has been illustrated as showing the recess 23 in engagement with the bolt head 10 and the recess 19 in engagement with the nut 11, these relative positions may be reversed depending upon the position of the bolt upon the lugs 8.

I claim as my invention:

1. A tool comprising a substantially cylindrical body portion having a longitudinal axis and having a recess at one end for engagement with a nut threadedly carried by a bolt, a movable member slidably and rotatably positioned on said body, an extension carried by said movable member, an anchor portion carried by said extension in substantial axial alignment with said body portion, said anchor portion being provided with a recess in substantial alignment with the body recess for engagement with the head of said bolt, resilient means bearing on said body and said movable member resiliently to urge said anchor portion toward the recessed end of said body portion, and abutment means upon said extension engageable with said body portion to limit relative motion between said extension and body portion under the influence of said resilient means.

2. A tool comprising a substantially cylindrical body having a longitudinal axis and having a polygonal recess at one end for engagement with a polygonal nut threadedly carried by a bolt positioned in a split collar, a movable sleeve slidably and rotatably positioned on said body, an extension carried by said movable sleeve, an anchor portion carried by said extension in substantial axial alignment with said body, said anchor portion being provided with a polygonal recess in substantial alignment with the body recess for engagement with the polygonal head of said bolt, a coil spring embracing said body and bearing upon a portion of said body and said movable member resiliently to urge said anchor portion toward the recessed end of said body, and abutment means upon said anchor portion making contact with said split collar to restrain rotation of the anchor portion relative to said body.

3. A tool comprising a substantially cylindrical body having a longitudinal axis and having a polygonal recess at one end for engagement with a polygonal nut threadedly carried by a bolt positioned in a split collar, said body also being provided with a polygonal recess for the reception of a wrench whereby to rotate said body about said axis, a movable sleeve slidably and rotatably positioned on said body, an extension carried by said movable sleeve, an anchor portion carried by said extension in substantial axial alignment with said body, said anchor portion being provided with a polygonal recess in substantial alignment with the body recess for engagement with the polygonal head of said bolt, a coil spring embracing said body and bearing upon a portion of said body and said movable member resiliently to urge said anchor portion toward the recessed end of said body, and abutment means upon said anchor portion making contact with said split collar to restrain rotation of the anchor portion relative to said body.

References Cited in the file of this patent

UNITED STATES PATENTS

| | | |
|---|---|---|
| 1,227,877 | Brisbin | May 29, 1917 |
| 1,260,698 | Moore et al. | Mar. 26, 1918 |
| 1,270,766 | Armstrong | July 2, 1918 |
| 1,367,969 | Holley | Feb. 8, 1921 |
| 1,426,682 | Snell | Aug. 22, 1922 |
| 1,477,355 | Jacobs | Dec. 11, 1923 |
| 1,483,019 | Smith et al. | Feb. 5, 1924 |